US006909719B1

United States Patent
Petersson et al.

(10) Patent No.: US 6,909,719 B1
(45) Date of Patent: Jun. 21, 2005

(54) METHOD, APPARATUS AND SYSTEM FOR PROVIDING MULTIPLE QUALITY OF SERVICE CLASSES TO SUBSCRIBERS IN A NETWORK

(75) Inventors: Stefan Petersson, Frisco, TX (US); Vladimir Alperovich, Dallas, TX (US); Shri Balachandran, El Paso, TX (US); Lee Davidson, McKinney, TX (US); Nauman Shakil, Plano, TX (US); Martin Reichelt, Plano, TX (US); Johan Sannero, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/469,913

(22) Filed: Dec. 22, 1999

(51) Int. Cl.[7] .......................... H04L 12/28; H04L 12/56
(52) U.S. Cl. ............................ 370/395.21; 370/395.42; 370/465; 455/410
(58) Field of Search ........................ 370/395.2, 395.21, 370/465, 230–231, 235, 310, 352–354, 395.1, 401, 395.42; 455/410, 403, 575

(56) References Cited

U.S. PATENT DOCUMENTS

| 6,104,931 A | * | 8/2000 | Havinis et al. ........... 455/456.5 |
| 6,198,921 B1 | * | 3/2001 | Youssefzadeh et al. ..... 455/428 |
| 6,510,146 B1 | * | 1/2003 | Korpela et al. ............. 370/332 |
| 6,606,311 B1 | * | 8/2003 | Wang et al. ................. 370/338 |
| 6,608,832 B2 | * | 8/2003 | Forslow ....................... 370/353 |

* cited by examiner

*Primary Examiner*—Dang Ton
*Assistant Examiner*—Inder Pal Mehra

(57) ABSTRACT

The present invention provides a system, method and apparatus for providing multiple quality of service classes to subscribers in a network by determining a subscriber's quality of service information by using a database containing quality of service information for each subscriber that has subscribed to one of the multiple quality of service classes, and storing the subscriber's quality of service information in a visitor location register where the subscriber is currently registered.

17 Claims, 2 Drawing Sheets

METHOD, APPARATUS AND SYSTEM FOR PROVIDING MULTIPLE QUALITY OF SERVICE CLASSES TO SUBSCRIBERS IN A NETWORK

TECHNICAL FIELD OF THE INVENTION

The present invention relates generally to telecommunications and more particularly to a method, apparatus and system for providing multiple quality of service classes to subscribers in a network.

BACKGROUND

Without limiting the scope of the present invention, this background of the present invention is described in connection with an asynchronous transfer mode ("ATM") network and more specifically with a Global System for Mobile communication ("GSM").

The popularity, complexity and scope of wireless communication networks have increased dramatically over the last few years. As a result, network owners and service providers are looking for ways to provide consumers or subscribers with new ways to apply wireless technology to their every day business and personal life. Moreover, wireless customers have become more sophisticated in their use of wireless technology and their expectation of competitive services at competitive prices.

For example, some customers want and are willing to pay for high-speed wireless data transmission using satellites communications. Other customers are not. As a result, customers are interested in having the option to choose from different transmission bandwidths, call routing priorities, security levels and other quality of service options.

What is needed is a method, apparatus and system for providing multiple quality of service classes to subscribers in a network.

SUMMARY OF THE INVENTION

The present invention provides a method, apparatus and system for providing multiple quality of service classes to subscribers in a network. More specifically, the present invention determines a subscriber's quality of service information by using a database containing quality of service information for each subscriber that has subscribed to one of the multiple quality of service classes, and stores the subscriber's quality of service information in a visitor location register where the subscriber is currently registered.

In addition, the present invention receives an attach request at a visitor location register and sends an update location request from the visitor location register to a database containing quality of service information for each subscriber that has subscribed to one of the multiple quality of service classes. The update location request is then sent from the database to a home location register. In response, an update location result is sent from the home location register to the database. The present invention then determines a subscriber's quality of service information using the database and modifies the update location result to include the subscriber's quality of service information. The modified update location result is sent to the visitor location register where the subscriber's quality of service information is stored.

Alternatively, the present invention receives an attach request at a visitor location register and sends an update location request from the visitor location register to a database containing quality of service information for each subscriber that has subscribed to one of the multiple quality of service classes. The present invention then determines a subscriber's quality of service information using the database and sends a first message from the database to the visitor location register, wherein the first message contains the subscriber's quality of service information. The subscriber's quality of service information is stored in the visitor location register and the visitor location register sends a second message to the database, wherein the second message acknowledges receipt of the first message. The update location request is then sent from the database to a home location register and a update location result is sent to the visitor location register.

The present invention also provides an apparatus having a database containing quality of service information for each subscriber that has subscribed to one of the multiple quality of service classes, a code segment for determining a subscriber's quality of service information using the database, and a code segment for sending the subscriber's quality of service information to a visitor location register where the subscriber is currently registered.

In addition, the present invention provides an apparatus having a database containing quality of service information for each subscriber that has subscribed to one of the multiple quality of service classes, a code segment for determining a subscriber's quality of service information using the database, a code segment for receiving an update location request from a visitor location register and sending the update location request to a home location register, a code segment for receiving an update location result from the home location register, a code segment for modifying the update location result to include the subscriber's quality of service information, and a code segment for sending the modified update location result to the visitor location register.

Similarly, the present invention provides an apparatus having a database containing quality of service information for each subscriber that has subscribed to one of the multiple quality of service classes, a code segment for determining a subscriber's quality of service information using the database, a code segment for sending a message to a visitor location register, wherein the message contains the subscriber's quality of service information, and a code segment for receiving an update location request from the visitor location register and sending the update location request a home location register.

The present invention also provides a system having a database containing quality of service information for each subscriber that has subscribed to one of the multiple quality of service classes, a visitor location register coupled to the database via a communication link, a code segment coupled to the database for determining a subscriber's quality of service information using the database, a code segment coupled to the database for sending the subscriber's quality of service information to the visitor location register, and a code segment coupled to the visitor location register for storing the subscriber's quality of service information in the visitor location register.

Other features and advantages of the present invention shall be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE PREFERRED EMBODIMENT

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
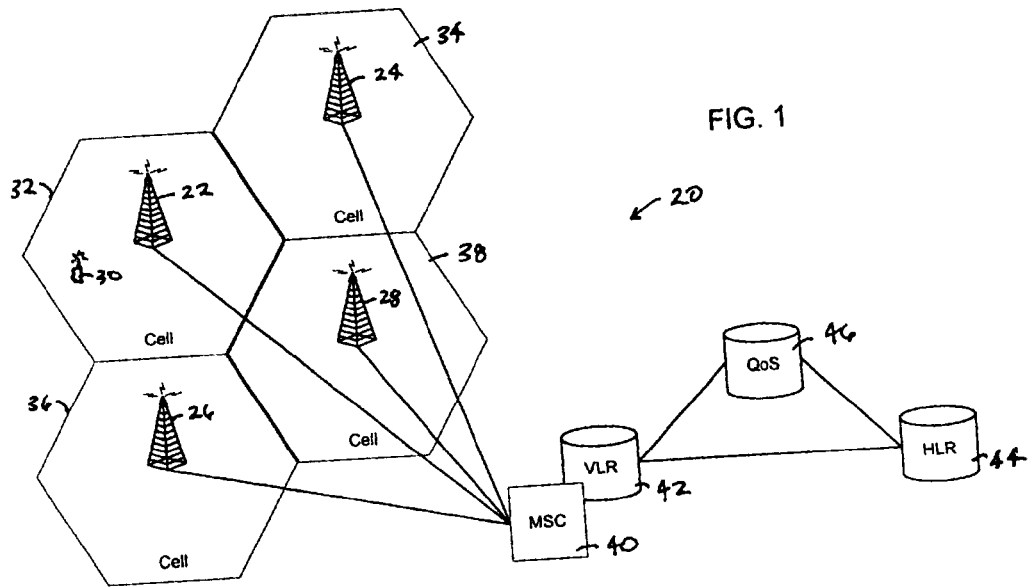
FIG. 1 depicts a block diagram illustrative of a mobile telecommunications network in accordance with a preferred embodiment of the present invention.

Referring to FIG. 1, a block diagram illustrative of a mobile telecommunications network 20 in accordance with a preferred embodiment of the present invention is shown. Mobile telecommunication networks provide service to customers, subscribers or terminals 30 through the use of antennas, such as 22, 24, 26 and 28. These transmit and receive antennas 22, 24, 26 and 28 typically include a base station controller and a base transceiver station collectively referred to as a base station system. These base station systems are defined and arranged in cells 32, 34, 36 and 38. Each cell 32, 34, 36 or 38 covers a geographical region in which a customer 30 can access the services of the mobile telecommunications network 20.

A group of cells 32, 34, 36 and 38 are connected to and controlled by a mobile switching center ("MSC") or switch 40 that performs the necessary routing of calls and services. Depending on the number of cells, a wireless network 20 may have several MSCs 40. Integrated within the MSC 40 is a visitor location register ("VLR") 42, which is a database that keeps track of customers, subscribers or terminals 30 within area served by the MSC 40. The VLR 42 is connected to a home location register ("HLR") 44, which is a database that keeps track of subscribers 30 as they move about the network 20. The HLR 44 also maintains service feature information about each subscriber 30. As will be discussed in more detail below, when a subscriber 30 moves into a new area under the control of a MSC, such as 40, the VLR 42 requests the information necessary to route calls to and from the subscriber 30 and implement his or her service features from the HLR 44.

The present invention also includes a database 46 that contains the quality of service information for all subscribers which have subscribed to a specific quality of service class in the network 20. Database 46 contains the MAP/TCAP/SCCP/MTP signaling stack and is placed in the SS7 network between the VLR 42 (SGSN in the GRPS case) and the HLR 44. The quality of service information dictates the transmission quality that the subscriber 30 will be granted at a call setup. This database 46 allows subscribers 30 to choose from multiple quality of service classes, which may include different transmission bandwidth, call routing priority, call security or other service quality parameters.

In operation, the present invention determines a subscriber's 30 quality of service information by using a database 46 containing quality of service information for each subscriber that has subscribed to one of the multiple quality of service classes. The present invention then stores the subscriber's 30 quality of service information in the VLR 42. where the subscriber 30 is currently registered. The subscriber's 30 quality of service information stored in the VLR 42 is used during a call setup to determine a call transmission quality for the subscriber 30.

As a result, the present invention allows a network operator the possibility of defining different quality of service classes by inserting database 46 into a network 20. Thus, the network operator can charge a standard fee for "default" quality of service and charge customers more if they desire a higher quality of service. As will be described below, the present invention is applicable to satellite networks as well as mobile networks.

Figure 2:
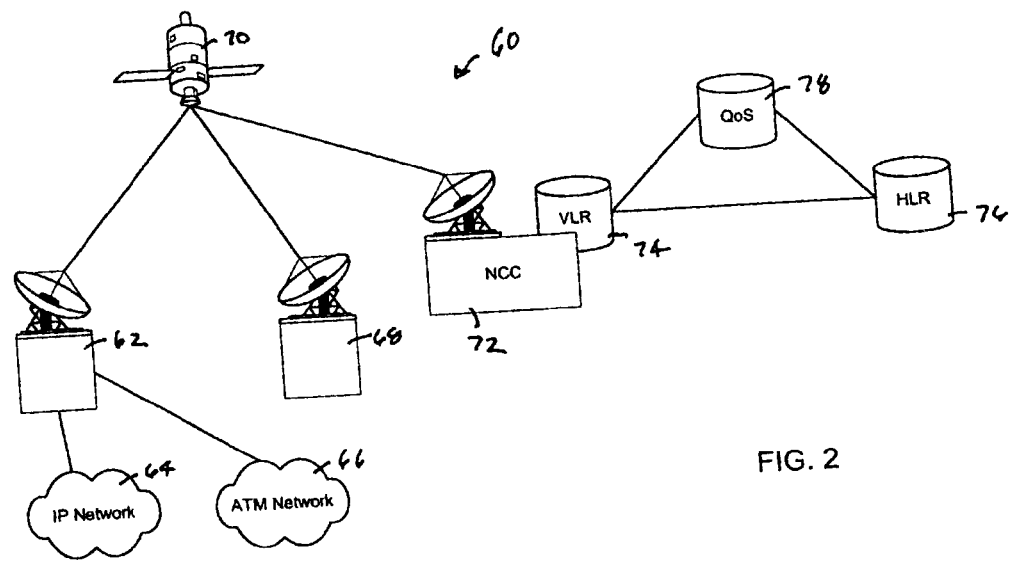
FIG. 2 depicts a block diagram illustrative of a satellite telecommunications network in accordance with a preferred embodiment of the present invention.

Now referring to FIG. 2, a block diagram illustrative of a satellite telecommunications network 60 in accordance with a preferred embodiment of the present invention is shown. The satellite telecommunications network 60 includes gateway earth stations 62 which connect to other types of networks, such as an IP network 64 or an ATM network 66, and user terminals 68. Gateway earth stations 62 and user terminals 68 communicate with a satellite 70, which is controlled by a network control center ("NCC") 72 that performs the necessary routing of calls and services. Integrated within the NCC 72 is a VLR 74, which is a database that keeps track of customers, subscribers or terminals within area served by the NCC 72. The VLR 74 is connected to HLR 76, which is a database that keeps track of subscribers as they move about the network. The HLR 76 also maintains service feature information about each subscriber. As will be discussed in more detail below, when a subscriber moves into a new area under the control of a NCC, such as 72, the VLR 74 requests the information necessary to route calls to and from the subscriber and implement his or her service features from the HLR 76.

The present invention also includes a database 78 that contains the quality of service information for all subscribers which have subscribed to a specific quality of service class in the network 60. Database 46 contains the MAP/TCAP/SCCP/MTP signaling stack and is placed in the SS7 network between the VLR 74 (SGSN in the GRPS case) and the HLR 76. The quality of service information dictates the transmission quality that the subscriber will be granted at a call setup. As previously described, this database 78 allows subscribers to choose from multiple quality of service classes, which may include different transmission bandwidth, call routing priority, call security or other service quality parameters.

As a result, the present invention allows a network operator the possibility of defining different quality of service classes by inserting database 78 into a network 60. Thus, the network operator can charge a standard fee. for "default" quality of service and charge customers more if they desire a higher quality of service. As will be described below, the present invention is applicable to satellite networks as well as mobile networks.

Figure 3:
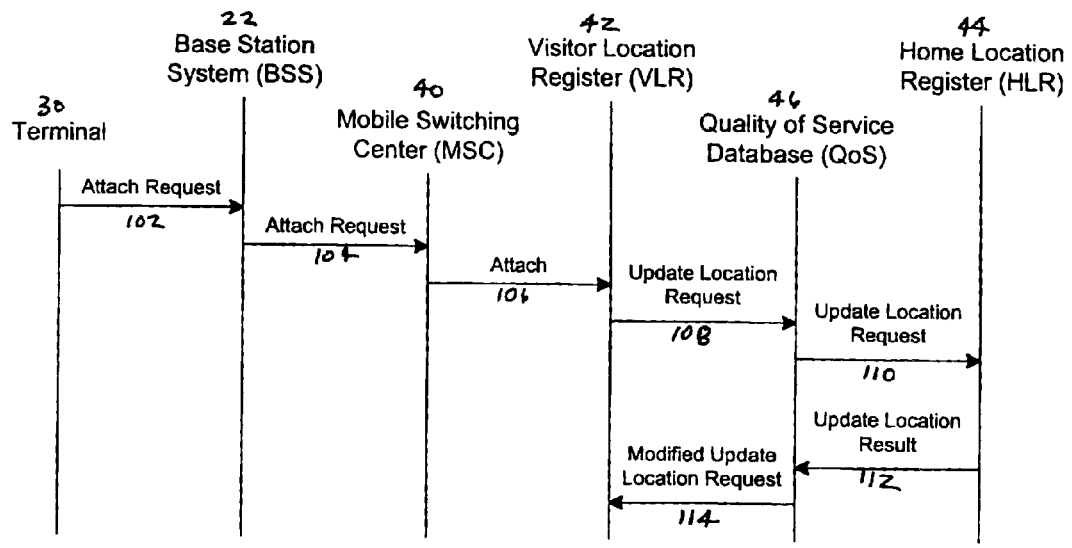
FIG. 3 depicts a signaling sequence illustrative of a mobile telecommunications network in accordance with a preferred embodiment of the present invention.

Referring now to FIG. 3, a signaling sequence illustrative of a mobile telecommunications network in accordance with a preferred embodiment of the present invention is shown. When a subscriber's terminal 30 is turned on or is moved to a BSS 22 controlled by a different MSC 40, the terminal 30 sends an attach request message 102 to the BSS 22, which in turn passes the attach request message 104 to the MSC 40. The attach request 106 is then sent to the VLR 42, which responds by sending an update location request 108 to the database 46, which contains quality of service information for each subscriber that has subscribed to one of the multiple quality of service classes. The database 46 then sends the update location request 110 to the HLR 44.

As previously described, the HLR 44 records the new call routing location (MSC 40) for terminal 30 and sends an update location result 112 to the database 46. The update location result 112 typically contains subscriber data that identifies the service features accessible by the subscriber's terminal 30. The present invention then determines the subscriber's quality of service information using the database 46 and modifies the update location result 112 to include the subscriber's quality of service information. The modified update location result 114 is sent to the VLR 42 where the subscriber's quality of service information is stored.

If the subscriber 30 is not listed in database 46, the subscriber's quality of service information will be set to correspond to a default quality of service class. The rest of the signaling process continues normally. A person skilled in the art would recognize that the previously described signaling sequence is merely an example that can be altered or modified to be applicable any standardized signaling protocol without limiting the scope of the claimed invention.

Figure 4:
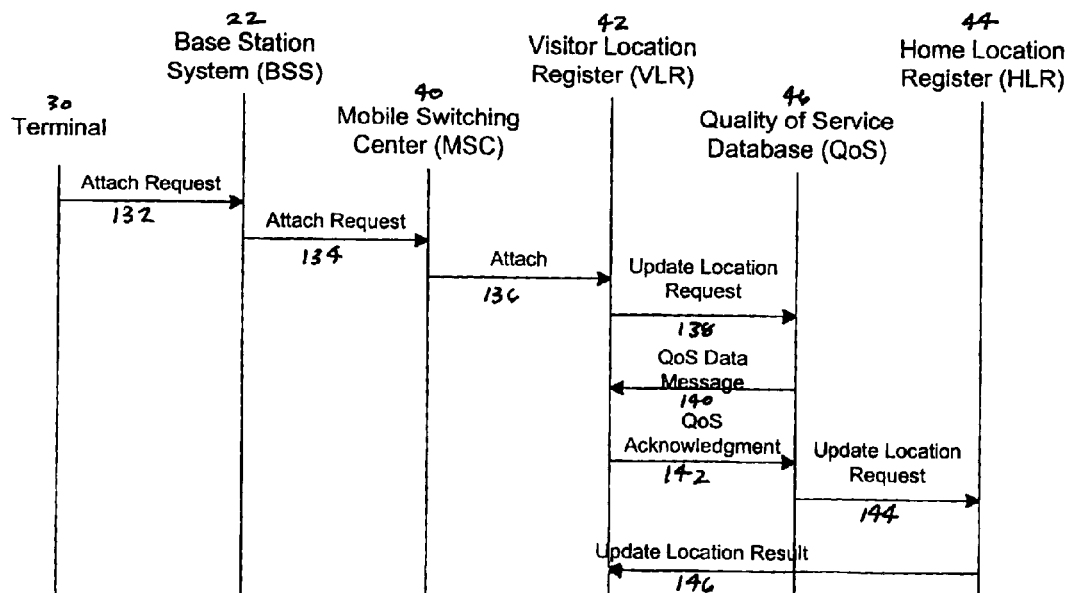
FIG. 4 depicts a signaling sequence illustrative of a mobile telecommunications network in accordance with an alternative embodiment of the present invention.

Now referring to FIG. 4, a signaling sequence illustrative of a mobile telecommunications network in accordance with an alternative embodiment of the present invention is shown. When a subscriber's terminal 30 is turned on or is moved to a BSS 22 controlled by a different MSC 40, the terminal 30 sends an attach request message 132 to the BSS 22, which in turn passes the attach request message 134 to the MSC 40. The attach request 136 is then sent to the VLR 42, which responds by sending an update location request 138 to the database 46, which contains quality of service information for each subscriber that has subscribed to one of the multiple quality of service classes.

The present invention then determines the subscriber's quality of service information using the database 46 and sends a first message 140 to the VLR 42, wherein the first message contains the subscriber's quality of service information. The VLR 42 stores the subscriber's quality of service information and sends a second message 142 to the database 46, wherein the second message acknowledges receipt of the first message 140. The database 46 then sends the update location request 144 to the HLR 44.

As previously described, the HLR 44 records the new call routing location (MSC 40) for terminal 30 and sends an update location result 146 to the VLR 42. The update location result 146 typically contains subscriber data that identifies the service features accessible by the subscriber's terminal 30.

If the subscriber 30 is not listed in database 46, the subscriber's quality of service information will be set to correspond to a default quality of service class. The rest of the signaling process continues normally. A person skilled in the art would recognize that the previously described signaling sequence is merely an example that can be altered or modified to be applicable any standardized signaling protocol without limiting the scope of the claimed invention.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of providing multiple quality of service classes to subscribers in a network, the method comprising the steps of:

determining a subscriber's quality of service information by using a database containing quality of service information for each subscriber that has subscribed to one of the multiple quality of service classes;

storing the subscriber's quality of service information in a visitor location register where the subscriber is currently registered; and using the subscriber's quality of service information stored in the visitor location register during a call setup to determine a call transmission quality: for the subscriber, wherein the call transmission quality corresponds to a default quality of service class when the subscriber is not listed in the database.

2. The method as recited in claim 1, wherein each quality of service class provides a different transmission bandwidth.

3. The method as recited in claim 1, wherein each quality of service class provides a different call routing priority.

4. The method as recited in claim 1, wherein each quality of service class provides a different level of call security.

5. The method as recited in claim 1, wherein the network is a asynchronous transfer mode network.

6. The method as recited in claim 1, wherein the network is a mobile access network and the visitor location register is integrated in a mobile switching center.

7. The method as recited in claim 1, wherein the network is a satellite network and the visitor location register is integrated in a network control center.

8. The method as recited in claim 1, wherein the subscriber accesses the network with a mobile terminal.

9. The method as recited in claim 1, wherein the subscriber accesses the network through a fixed access terminal.

10. A method of providing multiple quality of service classes to subscribers in a network, the method comprising the steps of:

receiving an attach request at a visitor location register;

sending an update location request from the visitor location register to a database containing quality of service information for each subscriber that has subscribed to one of the multiple quality of service classes;

sending the update location request from the database to a home location register;

sending an update location result from the home location register to the database;

determining a subscriber's quality of service information using the database;

modifying the update location result to include the subscriber's quality of service information;

sending the modified update location result to the visitor location register;

storing the subscriber's quality of service information in the visitor location register; and using the subscriber's quality of service information stored in the visitor location register during a call setup to determine a call transmission quality for the subscriber;

wherein the call transmission quality corresponds to a default quality of service class when the subscriber is not listed in the database.

11. The method as recited in claim 10, wherein each quality of service class provides a different transmission bandwidth.

12. The method as recited in claim 10, wherein each quality of service class provides a different call routing priority.

13. The method as recited in claim 10, wherein each quality of service class provides a different level of call security.

14. A method of providing multiple quality of service classes to subscribers in a network, the method comprising the steps of:

receiving an attach request at a visitor location register;

sending an update location request from the visitor location register to a database containing quality of service information for each subscriber that has subscribed to one of the multiple quality of service classes;

determining a subscriber's quality of service information using the database;

sending a first message from the database to the visitor location register, wherein the first message contains the subscriber's quality of service information;

storing the subscriber's quality of service information in the visitor location register;

sending a second message from the visitor location register to the database, wherein the second message acknowledges receipt of the first message;

sending the update location request from the database to a home location register;

sending the update location result to the visitor location register; and using the subscriber's quality of service information stored in the visitor location register during a call setup to determine a call transmission quality for the subscriber, wherein the call transmission quality corresponds to a default quality of service class when the subscriber is not listed in the database.

15. The method as recited in claim 14, wherein each quality of service class provides a different transmission bandwidth.

16. The method as recited in claim 14, wherein each quality of service class provides a different call routing priority.

17. The method as recited in claim 14, wherein each quality of service class provides a different level of call security.

* * * * *